United States Patent [19]

Ishikawa et al.

[11] Patent Number: 4,897,088

[45] Date of Patent: Jan. 30, 1990

[54] DISPERSING AGENT AND A SOLID FUEL SLURRY COMPOSITION CONTAINING THE SAME

[75] Inventors: Katuhiro Ishikawa, Chiba; Katsumi Ito, Suzuka; Youji Shigeyoshi, Yokkaichi, all of Japan

[73] Assignee: Japan Synthetic Rubber Co., Ltd., Tokyo, Japan

[21] Appl. No.: 236,729

[22] Filed: Aug. 26, 1988

[30] Foreign Application Priority Data

Aug. 28, 1987 [JP] Japan ................. 62-214275

[51] Int. Cl.$^4$ .......... C10L 5/00; B01F 17/14; C08C 19/20
[52] U.S. Cl. .................... 44/90; 44/51; 525/332.1; 525/333.1; 525/333.2; 525/353
[58] Field of Search ............ 44/90, 51; 525/332.1, 525/333.1, 333.2, 353

[56] References Cited

U.S. PATENT DOCUMENTS 4,457,762  7/1984  Papalos et al. ............ 44/90
4,564,371  1/1986  Ueda et al. ............... 44/90

FOREIGN PATENT DOCUMENTS 108496  6/1985  Japan ........................ 44/90

OTHER PUBLICATIONS

Patent Abstracts of Japan, vol. 11, No. 242, Aug. 7, 1987, p. 77 C 438, JP-A-62 48 795 (Japan Synthetic Rubber Co., Ltd.).
Patent Abstracts of Japan, vol. 12, No. 33, Jan. 30, 1988, p. 84 C 472, JP-A-62 181 393 (Japan Synthetic Rubber Co., Ltd.).
Patent Abstracts of Japan, vol. 11, No. 242, Aug. 7, 1987, p. 52 C 438, JP-1-62 48 705 (Japan Synthetic Rubber Co., Ltd.).

*Primary Examiner*—Carl F. Dees
*Attorney, Agent, or Firm*—Oblon, Spivak, McClelland, Maier & Neustadt

[57] ABSTRACT

A dispersing agent comprising as an essential component a salt of a sulfonation product of a polymer of an aliphatic diene or a copolymer of an aliphatic diene and an alkenyl monomer copolymerizable therewith. This dispersing agent can be effectively applied to an aqueous solid fuel slurry to obtain a solid fuel slurry composition having excellent stability when allowed to stand, excellent mechanical stability, excellent thermal stability and excellent small amount addition efficiency.

9 Claims, No Drawings

DISPERSING AGENT AND A SOLID FUEL SLURRY COMPOSITION CONTAINING THE SAME

This invention relates to a novel dispersing agent and a solid fuel slurry composition comprising the dispersing agent which has an excellent storage stability.

An energy system in which petroleum is the main energy source has heretofore been adopted; however, attention is now directed again to solid fuels such as coal, petroleum coke, pitch and the like, and utilization thereof is under consideration from various points of view.

However, the solid fuels are difficult to transport by a conventional pipeline, a tank lorry or the like, unlike liquid fuels such as petroleum and the like.

Therefore, various techniques have been proposed for preparing a slurry of a solid fuel such as coal or the like by pulverizing the solid fuel and dispersing the pulverized solid fuel in water and for handling the slurry similarly to liquid fuels. In this case, if a slurry having a low solid fuel concentration is prepared with a large amount of water, the slurry can be allowed to have a low viscosity; however, this is not advisable in view of the fuel efficiency. Also, the slurry thus obtained has a disadvantage that when the slurry is allowed to stand the solid fuel particles are sedimented.

In order to increase the solid fuel concentration, the addition of a dispersing agent has been proposed, whereby the dispersibility of the solid fuel in water is increased.

A solid fuel slurry having added thereto a dispersing agent has a greatly improved fluidity as compared with a dispersing agent-free solid fuel slurry. Therefore, it is reported that the use of a dispersing agent enables the production of a solid fuel slurry having a high concentration.

The solid fuel slurry thus produced is usually transported, stored and used as a fuel, and hence, the slurry requires a high fluidity and a long-period storage stability.

However, the heretofore proposed dispersing agents have not reached a well satisfactory level in respect of the long-period storage stability.

An object of this invention is to provide a novel dispersing agent which can solve the above-mentioned problems.

Another object of this invention is to provide a solid fuel slurry composition which has a high fluidity and can keep its storage stability for a long period of time even at a high concentration.

The present inventors have made extensive research to solve the problems mentioned above to find that the use of a specific novel dispersing agent enables one to obtain a high concentration solid fuel slurry composition which is excellent in fluidity and storage stability.

According to this invention, there is provided a dispersing agent comprising as an essential component a salt of a sulfonation product of a polymer of an aliphatic diene or a copolymer of an aliphatic diene and an alkenyl monomer (hereinafter referred to as the aliphatic diene (co)polymer).

This invention further provides a solid fuel slurry composition comprising (a) the above dispersing agent, (b) a solid fuel powder and (c) water as essential components.

The aliphatic diene which is the starting material for the dispersing agent of this invention [the (a) component of the solid fuel slurry composition of this invention] is a hydrocarbon having 4 to 7 carbon atoms and having two double bonds in the molecule, and includes, for example, 1,3-butadiene, 1,2-butadiene, 1,2-pentadiene, 1,3-pentadiene, 2,3-pentadiene, isoprene, 1,2-hexadiene, 1,3-hexadiene, 1,4-hexadiene, 1,5-hexadiene, 2,3-hexadiene, 2,4-hexadiene, 2,3-dimethyl-1,3-butadiene, 2-ethyl-1,3-butadiene, 1,2-heptadiene, 1,3-heptadiene, 1,4-heptadiene, 1,5-heptadiene, 1,6-heptadiene, 2,3-heptadiene, 2,5-heptadiene, 3,4-heptadiene, 3,5-heptadiene and the like. In addition, it includes various branched dienes having 4 to 7 carbon atoms. Preferred are 1,3-butadiene, isoprene and 1,3-pentadiene. Isoprene is particularly preferred.

These aliphatic dienes may be used alone or in combination of two or more.

In this invention, the aliphatic diene may be used with alkenyl monomers copolymerizable therewith (hereinafter referred to merely as the alkenyl monomers).

The alkenyl monomers include aromatic hydrocarbon compounds such as styrene, α-methylstyrene, vinyltoluene, p-methylstyrene and the like; alkyl esters of acrylic and methacrylic acids such as methyl acrylate, ethyl acrylate, butyl acrylate, 2-ethylhexyl acrylate, methyl methacrylate or the like; hydroxyalkyl esters of acrylic and methacrylic acids such as 2-hydroxyethyl acrylate, 2-hydroxyethyl methacrylate and the like; olefinically unsaturated mono- and di-carboxylic acids such as acrylic acid, methacrylic acid, crotonic acid, maleic acid, fumaric acid, itaconic acid and the like; anhydrides of the olefinically unsaturated dicarboxylic acids; alkenyl cyanide compounds such as acrylonitrile, methacrylonitrile and the like; and olefinically unsaturated compounds such as vinyl chloride, vinylidene chloride, vinylmethyl ethyl ketone, vinyl methyl ether, vinyl acetate, vinyl formate, allyl acetate, methallyl acetate, acrylamide, methacrylamide, N-methylol acrylamide, glycidyl acrylate, glycidyl methacrylate, acrolein, allyl alcohol and the like.

The alkenyl monomers may be used alone or in combination of two or more.

When the alkenyl monomers are used with the aliphatic diene, the amount of the alkenyl monomers used is 70% by weight, preferably 0.5–50% by weight and more preferably 1–30% by weight, based on the total weight of the monomers.

The aliphatic diene (co)polymer used in the dispersing agent of this invention includes polymers obtained by polymerizing at least one aliphatic diene and randam copolymers obtained by copolymerizing the aliphatic diene and the alkenyl monomers.

The method of preparing the aliphatic diene (co)polymer is as follows:

For example, the above aliphatic diene, (and the alkenyl monomers) is subjected to (co)polymerization with a radical polymerization initiator such as hydrogen peroxide, benzoyl peroxide, azobisisobutyronitrile or the like or an anionic polymerization initiator such as n-butyllithium, sodiumnaphthalene, metallic sodium or the like at a reaction temperature of −100° to 150° C., preferably 0° to 130° C. for a period of 0.1–20 hours to prepare the aliphatic diene (co)polymer.

In the above (co)polymerization, a (co)polymerization solvent may be used for conducting the reaction smoothly, and the solvent may be any solvent as far as it does not adversely affect the (co)polymerization reaction. It may be a polar solvent such as water or the like or a hydrocarbon or halogenated hydrocarbon solvent.

The molecular weight of the aliphatic diene (co)polymer thus obtained may be appropriately varied depending upon the reaction conditions, particularly the kind and amount of polymerization initiator, the kind and amount of solvent, the reaction temperature and the reaction time.

For example, when the aliphatic diene (co)polymer is used as the starting material for the dispersing agent contained in the solid fuel slurry composition of this invention, the molecular weight of the (co)polymer cannot be uniquely determined, because the characteristics of the (co)polymer may be varied depending upon the kind and particle size of the solid fuel powder. However, usually, the number average molecular weight of the aliphatic diene (co)polymer is 300–500,000, preferably 1,000–200,000.

The dispersing agent of this invention can be prepared by sulfonating the aliphatic diene (co)polymer and then neutralizing the sulfonation product. Said sulfonation of the aliphatic diene (co)polymer is conducted with a sulfonating agent such as sulfuric anhydride, a complex consisting of sulfuric anhydride and an electron-donating compound, chlorosulfonic acid, an acid sulfite, metabisulfite or sulfite of an alkali metal or the like in any conventional sulfonation manner. Particularly preferred is a dispersing agent prepared by sulfonating the aliphatic diene (co)polymer with a complex consisting of sulfuric anhydride and an electron-donating compound and then neutralizing the sulfonation product.

In the above sulfonation reaction, the amount of the sulfuric anhydride use is usually 0.6–1.2 moles, preferably 0.7–1.1 moles, per mole of the aliphatic diene unit in the aliphatic diene (co)polymer. When it is less than 0.6 mole, the dispersibility and mechanical stability of the solid fuel slurry composition of this invention becomes inferior, and when it is more than 1.2 moles, the dispersibility of the composition becomes inferior.

The electron-denoting compound includes compounds which form complexes with sulfuric anhydride, such as dioxane, trialkyl phosphate, pyridinem N,N-dimethylformamide, dibutyl ether, tetrahydrofuran, diethyl ether, triethylamine, trimethylamine, tributylamine, dimethyl sulfide, diethyl sulfide, acetonitrile, ethyl cyanide, propyl cyanide and the like. Particularly preferred is dioxane.

In the production of the complex, the amount of the electron-donating compound used is usually at least 0.5 mole, perferably at least 1 mole, and more preferably 2–10 moles, per mole of the sulfuric anhydride. When it is less than 0.5 mole, side reactions are caused during the sulfonation reaction and the aliphatic diene (co)polymer is in some cases carbonized. This is disadvantageous.

The reaction temperature in the production of the complex is usually not higher than 40° C., preferably not higher than 30° C., more preferably 10°–25° C. When the temperature is higher than 40° C., the rate of production of the complex is so high that side reactions tend to be caused and the electron-donating compound is carbonized.

In the sulfonation reaction, it is preferable to add the complex to the aliphatic diene (co)polymer or feed the two simultaneously to a reactor. In the sulfonation reaction, the addition of the aliphatic diene (co)polymer to the complex renders the surface tension of the sulfonation product obtained small. As a result, bubbles are formed in the slurry composition and a caviation problem is caused. In addition, the dispersibility and mechanical stability of the composition become inferior.

An appropriate solvent may be used in order to allow the sulfonation reaction of the aliphatic diene (co)polymer to proceed uniformly and smoothly. The solvent which may be advantageously used includes saturated hydrocarbons having 5 to 10 carbon atoms free of tertiary carbon such as n-pentane, n-hexane, n-heptane, n-octane, n-nonane, n-decane, cyclopentane, cyclohexane, cycloheptane, cyclooctane, cyclononane, cyclodecane and the like; haloganted hydrocarbons such as chloroform, carbon tetrachloride, dichloroethane, methylene chloride and the like; and the above-mentioned electron-donating compounds.

These solvents may be used alone or in combination of two or more.

The temperature for the sulfonation is usually $-30°$ to 80° C., preferably $-20°$ to 40° C. and when it is lower than $-60°$ C., the sulfonation reaction becomes slow and the sulfonation efficiency becomes low. On the other hand, when the sulfonation temperature is higher than 80° C., the formation of carbide is caused. This is disadvantageous.

The sulfonation can be conducted either at atmospheric pressure or under pressure.

The cation species of the salt of the sulfonation product obtained is not critical; however, preferred are alkali metals, alkaline earth metals, ammonia, amines and the like in order for the salt to be water-soluble.

Basic compounds which provide the above cation species are metal hydroxides such as sodium hydroxide, potassium hydroxide, lithium hydroxide, calcium hydroxide, zinc hydroxide, cadmium hydroxide and the like; alkali metal carbonates such as sodium carbonate, potassium carbonate and the like; alkali metal alkoxides such as sodium methoxide, sodium ethoxide, potassium methoxide, sodium t-butoxide, potassium t-butoxide and the like; organometallic compounds such as methyllithium, ethyllithium, n-butyllithium, sec-butyllithium, amyllithium, propylsodium, methylmagnesium chloride, ethylmagnesium bromide, propylmagnesium iodide, diethylmagnesium, diethylzinc, triethylaluminum, triisobutylaluminum and the like, ammonia water; amines such as trimethylamine, triethylamine, tripropylamine, pyridine, piperazine and the like; metals such as calcium, zinc, aluminum, tin and the like. Among these basic compounds, sodium hydroxide and ammonia are particularly preferred. These basic compounds may be used alone or in combination of two or more.

The amount of the basic compound used is usually 0.1–3 moles, preferably 0.5–2 moles, per mole of the sulfuric anhydride which is the sulfonating agent used in the sulfonation reaction. When it is less than 0.1 mole, the solubility of the product in water becomes low and when the product is used as a dispersing agent the dispersibility is inferior. When the above amount is more than 3 moles, the amount of the basic compound remaining unreacted becomes large and the purity becomes low.

The degree of neutralization of the sulfonic acid group may be appropriately selected so that the salt of the sulfonation product becomes water-soluble or water dispersible. Also, the sulfonic acid groups may form different salts.

The structure of the salt of the sulfonation product of the dispersing agent of this invention can be confirmed from absorption of the sulfonic acid group in an infrared absorption spectrum, and the composition ratio of the sulfonic acid groups can be determined by an acid-alkali titration such as potentiometric titration, conductometric analysis or the like. The structure can also be determined by a nuclear magnetic resonance.

The dispersing agent (a) used in the solid fuel slurry composition of this invention consists essentially of a salt of a sulfonation product of the aliphatic diene (co)polymer (hereinafter referred to as the salt of sulfonation product), and the sulfonic acid group content of the salt of sulfonation product is preferably 4-5.4 millimoles/g (in terms of sodium sulfonate, this appying hereinafter) more preferably 4.5-5.4 millimoles/g, and the surface tension of an aqueous solution of the salt of sulfonation product is preferably at least 50 dynes/cm, more preferably at least 55 dynes/cm.

When the sulfonic acid group content of the salt of sulfonation product is less than 4 millimoles/g, the composition obtained is inferior in dispersibility and mechanical stability and the amount of the dispersing agent (a) required becomes large, which is economically disadvantageous. On the other hand, it is more than 5.4 millimoles/g, the dispersibility and fluidity of the composition obtained become inferior.

When the surface tension of the aqueous solution of the salt of sulfonation product is less than 50 dynes/cm, the dispersibility of the composition obtained becomes inferior and many bubbles are formed in the composition, and cause cavitation in the transportation of the composition by a slurry pump or other undesirable phenomena.

The addition of a sulfuric acid salt together with the dispersing agent (a) to the composition is preferable in that the dispersion stability is enhanced, the viscosity of slurry is lowered and an excellent dispersion efficiency is obtained. Said sulfuric acid salt is preferably a salt of sulfuric acid with a metal of Groups I and II of the Periodic Table or an ammonium sulfate. Salts of sulfuric acid with metals of Group I of the Periodic Table and ammonium sulfate are more perferable, and sodium sulfate is most perferable.

Besides the sulfate, the addition of a hydrochloric acid salt, a nitric acid salt, a carboxylic acid salt, a sulfonic acid salt or the like is also effective. However, in view of corrosion of a combustion furnace due to chloride ions, increase of $NO_x$ and economical efficiency, sulfuric acid salts are most preferable.

The amount of the sulfuric acid salt added is usually at least 1% by weight, preferably 2-200% by weight, more perferably 3-100% by weight, and most preferably 3-50% by weight, based on the weight of the dispersing agent (a). It is particularly perferably 5-20% by weight.

In the solid fuel slurry composition of this invention, the dispersing agent (a) may be used alone or in combination with other water-soluble polymers, and the use of said other water-soluble polymers together with the dispersing agent (a) brings about a better result. Said other water-soluble polymers are as follows:

(A) polymer comprising a structural unit of a salt of naphthalenesulfonic acid, such as an aldehyde condensate of a salt of naphthalenesulfonic acid or the like, (B) polymer comprising a structural unit of a salt of ligninesulfonic acid and a derivative thereof, (C) polymer comprising a structural unit of a salt of styrenesulfonic acid such as a salt of polystyrenesulfonic acid, styrene/styrenesulfonate copolymer or the like, (D) polymer comprising a structural unit of a salt of norbornenesulfonic acid such as a (co)polymer of a salt of sulfonation product of a norbornene derivative such as 5-propenylnorbornene-2, dicyclopentadiene, 5-ethylidenenorbornene-2 or the like, (E) polymer comprising a structural unit of a salt of a carboxylic acid such as a salt of (co)polymer of (meth)acrylic acid, maleic acid, fumaric acid, phthalic acid or the like, and (F) polymer comprising a structural unit of a polyether such as (co)polymer of ethylene oxide, butylene oxide, styrene oxide or the like; a derivative of the (co)polymer; polyalkylene glycol mono(meth)acrylate; or the like.

These water-soluble polymers may be used alone or in combination of two or more.

The proportion of the salt of sulfonation product of the dispersing agent (a) to said other water-soluble polymer is usually 15/85-95/5 by weight, perferably 25/75 to 75/25 by weight. When the proportion of the salt of sulfonation product is less than 15/85 by weight, at least one of the dispersibility, stability when allowed to stand, thermal stability and mechanical stability of the composition obtained becomes inferior.

When the salt of sulfonation product of the dispersing agent is prepared in the form of an aqueous solution, it may be used as it is as the dispersing agent (a), and if necessary, the salt may be separated from the aqueous solution and dried to obtain a solid water-soluble salt of sulfonation product.

The solid fuel used in the composition of this invention is coal, petroleum coke, pitch or charcoal. Coal may be brown coal, sub-bituminous coal, bituminous coal, anthracite or the like, and de-ashed coal obtained by cleaning them may be used. The kind of coal is not critical.

Petroleum coke refers to cracked oil-freed residual coke obtained by pyrolysis at a high temperature of asphalt, pitch or the like obtained as heavy residue by distillation in petroleum refining, and is much more difficult to wet with water than coal containing inorganic matter.

The pitch refers to heavy residue in petroleum refining and oil-containing heavy residue obtained by distillation of tar obtained by dry distillation of coal and has preferably a softening point of 50° to 180° C. When the softening point is lower than 50° C., pulverization is difficult. The pitch contains substantially no ash and water as compared with coal, and can be formed into a slurry fuel having a high calorific value.

The solid fuel may have any particle size as far as it is powder. Finely divided coal which is now burnt in a thermoelectric power plant contains at least 70% by weight of 200-mesh pass particles, and this particles size indicates a preferable one.

However, the dispersing agent of this invention is not affected by the particle size and kind of the solid fuel, and can exhibit its excellent effect for any solid fuel powder.

The dispersing agent of this invention may be added alone or, if necessary, along with a surfactant, additives or the like to a solid fuel slurry composition having a solid fuel concentration of 50-85% by weight, preferably 60-80% by weight based on the weight of the total weight of the composition.

The larger the amount of the dispersing agent added, the lower the viscosity of the slurry composition, and hence, an amount of the dispersing agent for obtaining any desired viscosity can be selected, and this is usually 0.01–10% by weight based on the total weight of the slurry composition, and 0.05–2% by weight is preferred in view of workability and economical efficiency.

The surfactant which can, if necessary, be incorporated into the solid fuel slurry composition of this invention includes dodecylbenzenesulfonic acid salt, oleic acid salt, alkylbenzenesulfonic acid salt, dialkylsulfosuccinic acid salt, ligninesulfonic acid salt, alcohol-ethoxysulfate, secondary alkanesulfonate, α-olefinsulfonic acid, Tamol (trade mark of Rohm & Haas) and the like, and a commercially available dispersing agent or wetting agent of the carboxylic acid type, sulfuric acid ester type, sulfonic acid type, phosphoric acid ester type or alkylarylsulfonate type formed by mixing the above-mentioned surfactants can be used.

The additive includes chelating agents for trapping polyvalent metals contained in the ash of the solid fuel, potassium tetrapolyphosphoric acid, sodium citrate, sodium gluconate, poly(sodium acrylate), polycarboxylic acids and the like.

In order to inhibit the formation of bubbles anti-foaming agents can be added. The anti-foaming agents include, for example, emulsions of silicasilicon type, metal soap type, amide type, ester type and polyether type, among which the silicasilicon type emulsion is most preferable.

Moreover, as a stabilizer, organic and inorganic ones are effective, and the organic stabilizer includes semi-synthetic sizes of cellulose type and xanthan gum of cellulose type and the like, and the inorganic stabilizer includes bentonite.

In order to prevent freezing in winter, a freezing point-depressing agent may be added. The freezing point-depressing agent includes lower alcohols such as ethylene glycol and the like and polyhydric alcohols.

The method of preparing the solid fuel slurry composition of this invention is not critical, and may be a method consisting of mixing a solid fuel, water and the dispersing agent in any desired manner.

For example, there may be used a method comprising previously pulverizing a solid fuel and then mixing it with an aqueous solution of the dispersing agent, a method comprising preparing a solid fuel slurry and then adding the dispersing agent to the slurry, a method comprising placing the solid fuel, water and the dispersing agent in a mill and then mixing them while pulverizing the solid fuel and any other methods.

When the dispersing agent of this invention is present in the solid fuel slurry composition of this invention, the dispersing agent is adsorbed on the solid fuel particles, and the approaching of the particles to one another is prevented by the resulting electrostatic power and the action of the dispersing agent present in water. Consequently, obtained is a slurry composition excellent in fluidity, storage stability, mechanical stability, thermal stability and small amount addition efficiency.

The dispersing agent of this invention also exhibits excellent function in uses such as pigment-dispersing agent, concrete-fluidizing agent, ceramics-dispersing agent, agent for preparing muddy water, fiber-treating agent, water-treating agent and the like.

This invention is explained in more detail below referring to Examples, in which % is by weight unless otherwise specified.

In the Examples, various measurements were made according to the following methods:

Sulfonic acid group content: A 20% aqueous solution of each of the dispersing agents was prepared and then subjected to a dialysis membrane (cellulose Dialyzer Tubing-VT351, a trade name of Nakarai Kagaku Yakuhin Kabushiki Kaisha) to remove the inorganic salts contained therein. The purified sample thus obtained is subjected to ion-exchange through a cation-exchange resin (Amberlite IR-118(H), trade name of Organo Kabushiki Kaisha) to convert completely the sample to acid type, after which the sulfonic acid group content was determined by potentiometric titration.

Surface tension: A 4% aqueous solution of each of the dispersing agents was prepared, and subjected to measurement by a tensiometer.

Number average molecular weight: Determined by a gel permeation chromatography (GPC) using polystyrene or poly(sodium styrenesulfonate) as standard sample.

Dispersibility: Viscosity of a coal slurry was measured at 25° C. and the dispersibility was evaluated from the viscosity.

Stability when allowed to stand: A coal slurry was allowed to stand for 30 days, and the viscosity of the slurry was measured. Stability was evaluated by comparing the viscosity with the initial viscosity. Assuming P=viscosity after 30 days/initial viscosity, the stability was indicated as ○ when P=2 or less and as X when P=more than 2.

Mechanical stability: A coal slurry was stirred for 60 minutes by a homomixer at 3,000 rpm, and the viscosity after stirring was measured. The stability was evaluated by comparing this viscosity with the initial viscosity. Assuming Q=viscosity after 60 minutes/initial viscosity, the stability is indicated as ○ when Q=2 or less and as X when Q=more than 2.

Thermal stability: A coal slurry was allowed to stand for 10 minutes at 80° C., and the viscosity after allowed to stand was measured. The stability was evaluated by comparing this viscosity with the initial viscosity. Assuming R=viscosity at 80° C./initial viscosity, the stability was indicated as ○ when R=0.8 or less and as X when R=more than 0.8.

Small amount addition efficiency: This efficiency was evaluated by comparing the viscosity of a coal slurry containing the dispersing agent in an amount of 0.3% based on the weight of the coal with the viscosity of a coal slurry containing the dispersing agent in an amount of 0.5% based on the weight of the coal. Assuming S=viscosity of coal slurry containing 0.3% of the dispersing agent/viscosity of a coal slurry containing 0.5% of dispersing agent, the efficiency was indicated as ○ when S=1.3 or less and as X when S=more than 1.3.

EXAMPLE 1

(1) In a pressure reactor were placed 35.0 g of isoprene, 0.44 g of n-butyllithium and 200 g of cyclohexane, and the resulting mixture was subjected to polymerization of a temperature of 60° to 90° C. for 4 hours, after which 1 g of isopropyl alcohol was added to the polymerization mixture to terminate the polymerization.

Subsequently, the solvent and the unreacted monomer were removed by distillation under reduced pressure, and thereafter, the residue thus obtained was diluted with 50 g of 1,2-dichloroethane.

(2) Subsequently, in a separate reactor, 45.3 g of sulfuric anhydride was added to 150 g of N,N-dimethylformamide while keeping the internal temperature at 25° C., and the resulting mixture was stirred for 2 hours to obtain a sulfuric anhydride-N,N-dimethylformamide complex.

(3) The complex obtained in (2) above was added to the polymer solution obtained in (1) above over 1 hour while keeping the internal temperature at 10° C. After the completion of the addition, stirring was conducted for 2 hours, and thereafter, 25.0 g of sodium hydroxide and 150 g of water were added thereto, after which the resulting mixture was stirred for 1 hour. Thereafter, the water and the solvent were removed by distillation under reduced pressure, and then the residue was subjected to dialysis through a cellulose dialysis membrane (VT-351), after which the dialyzate was concentrated to obtain a salt of sulfonation product in the form of yellow powder.

This product was hereinafter referred to as Polymer 1.

EXAMPLE 2

(1) Into a pressure reactor were charged 35.0 g of isoprene, 0.44 of n-butyllithium and 200 g of cyclohexane, and the resulting mixture was subjected to polymerization at 60° C. for 2 hours, after which 1 g of isopropyl alcohol was added to the polymerization mixture to terminate the polymerization.

Subsequently, the solvent and the unreacted monomer were removed by distillation under reduced pressure, and thereafter the residue was diluted with 50 g of 1,2-dichloroethane.

(2) Subsequently, in a separate reactor, 32.9 g of sulfuric anhydride was added to 100 g of dioxane while keeping the internal temperature at 25° C., and then the resulting mixture was stirred for 2 hours to obtain a sulfuric anhydride-dioxane complex.

(3) The complex obtained in (2) above was added to the polymer solution obtained in (1) above over 2 hours while keeping the internal temperature at 20° C. Thereafter, stirring was conducted for 2 hours, and then, 18.0 g of sodium hydroxide and 150 g of water were added to the reaction mixture, after which the resulting mixture was stirred at 80° C. for 1 hour. Thereafter, the water and the solvent were removed by distillation under reduced pressure, and the residue was subjected to dialysis through a cellulose dialysis membrane (VT-351), after which the dialyzate was concentrated to obtain a salt of sulfonation product in the form of yellow powder.

This product is hereinafter referred to as Polymer 2.

In order to investigate the sulfonic acid group distribution in the sulfonation product of polymer obtained in this Example, the sulfonic acid group content was measured on the way of sulfonation reaction. The results obtained are shown in Table 5.

As is clear from Table 5, in this Example, the sulfonic acid group content is increased proportionally with the lapse of sulfonation reaction time, and hence, the sulfonation product has a uniform composition.

EXAMPLE 3

(1) Into a pressure reactor were charged 35.0 g of isoprene, 0.12 g of n-butyllithium and 200 g of cyclohexane, and the resulting mixture was subjected to polymerization at 60° C. for 2 hours, after which 1 g of isopropyl alcohol was added to the polymerization mixture to terminate the polymerization.

Subsequently, the solvent and the unreacted monomer were removed by distillation under reduced pressure, and thereafter, the residue was diluted with 50 g of dioxane.

(2) To a separate reactor, 32.9 g of sulfuric anhydride was added to 100 g of dioxane over 1 hour while keeping the internal temperature at 25° C., and the resulting mixture was stirred for 2 hours to obtain a sulfuric anhydride-dioxane complex.

(3) The complex obtained in (2) above was added to the polymer solution in (1) above over 1 hour while keeping the internal temperature at 25° C., and thereafter stirring was conducted for 1 hour, after which 15.0 g of sodium hydroxide and 150 g of water were added to the mixture, and the resulting mixture was stirred at 80° C. for 1 hour. Thereafter, the water and the solvent were removed by distillation under reduced pressure, and the residue was subjected to dialysis through a cellulose dialysis membrane (VT-351), and the dialyzate was concentrated to obtain a salt of sulfonation product in the form of yellow powder.

EXAMPLE 4

The same procedure as in Example 1 was repeated, except that 28.0 g of 1,3-butadiene was substituted for the 35.0 g of isoprene, the amount of sulfuric anhydride was changed to 32.9 g and the amount of sodium hydroxide was changed to 16.5 g, to obtain a product.

EXAMPLE 5

The same procedure as in Example 2 was repeated, except that 24.7 g of 1,3-pentadiene was substituted for the 35.0 g of isoprene, the amount of n-butyllithium was changed to 0.08 g, the amount of sulfuric anhydride was changed to 24.7 g and the amount of sodium hydroxide was changed to 12.4 g, to obtain a product.

EXAMPLE 6

The same procedure as in Example 1 was repeated, except that 28.0 g of 1,3-butadiene and 3 g of methyl methacrylate were substituted for the 35.0 g of isoprene, the amount of n-butyllithium was changed to 0.12 g, the amount of sulfuric anhydride was changed to 24.7 g and the amount of sodium hydroxide was changed to 12.4 g, to obtain a product.

EXAMPLE 7

The same procedure as in Example 2 was repeated, except that 17.5 g of 1,3-pentadiene was substituted for the 35.0 g of isoprene, the amount of n-butyllithium was changed to 0.12 g, the amount of sulfuric anhydride was changed to 41.2 g and the amount of sodium hydroxide was changed to 20.6 g, to obtain a product.

EXAMPLE 8

The same procedure as in Example 1 was repeated, except that 7 g of azobisisobutyronitrile was substituted for the n-butyllithium, the polymerization time was changed to 8 hours and the amounts of sulfuric anhydride and sodium hydroxide were changed to 16.5 g and 8.3 g, respectively, to obtain a product.

EXAMPLE 9

The same procedure as in Example 8 was repeated, except that 1,3-butadiene was substituted for the isoprene, to obtain a product.

EXAMPLES 10 TO 15

As shown in Table 1, Polymer 1 or Polymer 2 was blended with a formaldehyde condensate of sodium naphthalenesulfonate, sodium ligninesulfonate, poly(sodium styrenesulfonate), poly(sodium acrylate), an ethylene oxide/propylene oxide copolymer or a polymer of sulfonate dicyclopentadiene to prepare dispersing agents.

EXAMPLE 16

The same procedure as in Example 2 was repeated, except that the polymer solution obtained in Example 2 (1) was added to the sulfuric anhydride-dioxide complex obtained in Example 2 (2) over 2 hours, to obtain a product.

The sulfonic acid group distribution in the sulfonation product of polymer was investigated by measuring the sulfonic acid group content on the way of sulfonation reaction. The results obtained are shown in Table 5.

As is clear from Table 5, the sulfonic acid group content was high at the initial stage of sulfonation reaction. This means that the final sulfonation product was a mixture of a product having a higher sulfonic acid group content and a product of a lower sulfonic acid group content.

EXAMPLE 17

The same procedure as in Example 2 was repeated, except that the amounts of sulfuric anhydride and sodium hydroxide were changed to 53.5 g and 26.8 g, respectively, to obtain a product.

The dispersing agents obtained in Examples 1 to 9, 16 and 17 had the sulfonic acid group contents, surface tensions and number average molecular weights shown in Table 2.

TABLE 1

| Example No. | Dispersing agent (weight ratio) | |
|---|---|---|
| 10 | Polymer 1/formaldehyde condensate of sodium naphthalenesulfonate | (70/30) |
| 11 | Polymer 1/sodium ligninesulfonate | (70/30) |
| 12 | Polymer 2/poly(sodium styrenesulfonate) | (70/30) |
| 13 | Polymer 2/poly(sodium acrylate) | (70/30) |
| 14 | Polymer 1/ethylene oxide-propylene oxide copolymer | (70/30) |
| 15 | Polymer 2/polymer of sulfonated dicyclopentadiene | (70/30) |

TABLE 2

| Example No. | Number average molecular weight of aliphatic diene (co)polymer | Dispersing agent Sulfonic acid group content (mmol/g) | Dispersing agent surface tension (dyne/cm) | Dispersing agent Number average molecular weight |
|---|---|---|---|---|
| 1 | 10,000 | 5.1 | 70 | 18,000 |
| 2 | 10,000 | 4.7 | 63 | 16,000 |
| 3 | 49,000 | 4.8 | 64 | 80,000 |
| 4 | 9,000 | 4.8 | 62 | 15,000 |
| 5 | 81,000 | 4.1 | 56 | 150,000 |
| 6 | 52,000 | 5.0 | 69 | 86,000 |
| 7 | 30,000 | 5.0 | 68 | 54,000 |
| 8 | 8,000 | 4.7 | 62 | 12,000 |
| 9 | 15,000 | 4.6 | 59 | 26,000 |
| 16 | 10,000 | 4.7 | 45 | 18,000 |
| 17 | 10,000 | 5.5 | 71 | 21,000 |

EXAMPLES 18 TO 32 AND COMPARATIVE EXAMPLES 1 AND 2

The coal used was the Australian product, contained 80% of 200 mesh-pass particles and had an ash content of 6.5% and a sulfur content of 1.6%.

One of the dispersing agents shown in Table 3 was previously added to water in a proportion of 0.5% based on the weight of the coal, and the pre-determined amount of coal was gradually added thereto. The resulting mixture was stirred by a homomixer at 3,000 rpm for 15 minutes to prepare a coal slurry having a concentration of 70%.

The coal slurry thus obtained was evaluated to obtain the results shown in Table 3.

As is clear from Table 3, the slurry composition obtained by this invention had a low viscosity and was excellent in stability when allowed to stand, mechanical stability, thermal stability and small amount addition efficiency.

In Comparative Example 1, commercially available formaldehyde condensate of sodium naphthalenesulfonate was used as a dispersing agent, and the slurry viscosity was high and the stability when allowed to stand, the mechanical stability and the small amount addition efficiency were inferior.

In Comparative Example 2, commercially available ethylene oxide/propylene oxide copolymer was used as a dispersing agent, and the slurry viscosity was low while the mechanical stability, the thermal stability and the small amount addition efficiency were inferior.

EXAMPLES 33 TO 35

Petroleum coke containing 70% of 200 mesh-pass particles and having an ash content of 0.65% and a sulfur content of 0.30% was used.

One of the dispersing agents shown in Table 3 was previously added to water, and the pre-determined amount of petroleum coke was gradually added thereto, after which the resulting mixture was stirred by a homomixer at 3,000 rpm for 15 minutes to prepare an aqueous petroleum coke slurry.

The coal slurry thus obtained was evaluated to obtain the results shown in Table 3.

As is clear from Table 3, the slurry composition obtained by this invention had a low viscosity and excellent stability when allowed to stand, excellent mechanical stability, excellent thermal stability and excellent small amount addition efficiency.

From Table 3, it is seen that the aqueous petroleum coke slurry composition of this invention is excellent.

EXAMPLES 36 TO 41

The pre-determined amount of a sulfuric acid salt was added to each of the dispersing agents used in Examples 18 to 23, and the resulting mixture was mixed with the same coal as in Examples 18 to 23 in the same manner as in Examples 18 to 23 so that the total amount of the dispersing agent and the sulfate became 0.5% based on the weight of the coal. The resulting coal slurry composition was evaluated in the same manner as in Example 18 to obtain the results shown in Table 4.

TABLE 3

| Example No. | Kind of dispersing agent | Dispersibility (cps) | Stability when allowed to stand (P) | Mechanical stability (Q) | Thermal stability (R) | Small amount addition efficiency (S) | Collective evaluation |
|---|---|---|---|---|---|---|---|
| 18 | Example 1 | 790 | 1.0 (o) | 1.0 (o) | 0.5 (o) | 1.1 (o) | o |
| 19 | Example 2 | 720 | 1.1 (o) | 1.3 (o) | 0.4 (o) | 1.2 (o) | o |
| 20 | Example 3 | 850 | 1.0 (o) | 1.5 (o) | 0.6 (o) | 0.9 (o) | o |
| 21 | Example 4 | 650 | 1.0 (o) | 1.1 (o) | 0.5 (o) | 0.8 (o) | o |
| 22 | Example 5 | 850 | 1.2 (o) | 1.6 (o) | 0.4 (o) | 1.1 (o) | o |
| 23 | Example 6 | 870 | 1.4 (o) | 1.2 (o) | 0.6 (o) | 1.0 (o) | o |
| 24 | Example 7 | 780 | 1.0 (o) | 1.1 (o) | 0.4 (o) | 1.1 (o) | o |
| 25 | Example 8 | 700 | 1.1 (o) | 1.3 (o) | 0.5 (o) | 1.0 (o) | o |
| 26 | Example 9 | 730 | 1.1 (o) | 1.3 (o) | 0.4 (o) | 0.9 (o) | o |
| 27 | Example 10 | 660 | 1.1 (o) | 1.3 (o) | 0.7 (o) | 1.3 (o) | o |
| 28 | Example 11 | 650 | 1.2 (o) | 1.3 (o) | 0.7 (o) | 1.2 (o) | o |
| 29 | Example 12 | 620 | 1.1 (o) | 1.2 (o) | 0.5 (o) | 1.0 (o) | o |
| 30 | Example 13 | 650 | 1.2 (o) | 1.5 (o) | 0.6 (o) | 1.1 (o) | o |
| 31 | Example 14 | 630 | 1.1 (o) | 1.5 (o) | 0.7 (o) | 1.3 (o) | o |
| 32 | Example 15 | 630 | 1.3 (o) | 1.3 (o) | 0.5 (o) | 1.1 (o) | o |
| 33 | Example 1 | 740 | 1.0 (o) | 1.1 (o) | 0.4 (o) | 1.0 (o) | o |
| 34 | Example 2 | 760 | 1.1 (o) | 1.3 (o) | 0.4 (o) | 1.1 (o) | o |
| 35 | Example 3 | 800 | 1.2 (o) | 1.4 (o) | 0.5 (o) | 1.0 (o) | o |
| Comp. Ex. 1 | *1 | 1,420 | 3.0 (x) | 3.0 (x) | 0.6 (o) | 3.0 (x) | x |
| Comp. Ex. 2 | *2 | 730 | 1.2 (o) | 2.8 (x) | 3.0 (x) | 2.8 (x) | x |

Note:
*1 Formaldehyde condensate of sodium naphthalenesulfonate.
*2 Ethylene oxide propylene oxide copolymer.

TABLE 4

| Example No. | Kind of dispersing agent | Salt added Kind | Salt added Amount (wt. %*) | Dispersibility (cps) | Stability when allowed to stand (P) | Mechanical stability (Q) | Thermal stability (R) | Small amount addition efficiency (S) | Collective evaluation |
|---|---|---|---|---|---|---|---|---|---|
| 36 | Example 1 | Na$_2$SO$_4$ | 20 | 610 | 1.0 (o) | 1.1 (o) | 0.5 (o) | 0.8 (o) | o |
| 37 | Example 2 | " | 50 | 650 | 1.0 (o) | 1.3 (o) | 0.5 (o) | 1.1 (o) | o |
| 38 | Example 3 | " | 100 | 610 | 1.3 (o) | 1.2 (o) | 0.4 (o) | 1.3 (o) | o |
| 39 | Example 4 | Na$_2$SO$_4$ (NH$_4$)$_2$SO$_4$ | 8 20 | 690 | 1.1 (o) | 1.0 (o) | 0.6 (o) | 0.9 (o) | o |
| 40 | Example 5 | K$_2$SO$_4$ Na$_2$SO$_4$ | 20 5 | 680 | 1.0 (o) | 1.1 (o) | 0.5 (o) | 1.0 (o) | o |
| 41 | Example 6 | Na$_2$SO$_4$ | 2 | 680 | 1.1 (o) | 1.1 (o) | 0.5 (o) | 1.1 (o) | o |

Note:
*Proportion based on the weight of the dispersing agent.

TABLE 5

| Example No. | Sulfonic acid group content (mmol./g) | | | |
|---|---|---|---|---|
| | After 30 min* | After 60 min* | After 90 min* | After 120 min* |
| 2 | 5.3 | 5.4 | 5.0 | 4.7 |
| 16 | 1.2 | 2.8 | 3.6 | 4.7 |

Note: *Time elapsed from the initiation of reaction.

What is claimed is:

1. A dispersing agent comprising as an essential component a salt of a sulfonation product of a polymer of an aliphatic diene or a copolymer of an aliphatic diene and an alkenyl monomer copolymerizable therewith.

2. The dispersing agent according to claim 1, wherein the polymer or the copolymer has a weight average molecular weight of 300–500,000.

3. The dispersing agent according to claim 1, wherein the salt of a sulfonation product of a polymer of an aliphatic diene or a copolymer of an aliphatic diene and an alkenyl monomer copolymerizable therewith is obtained by sulfonating a polymer of an aliphatic diene or a copolymer of an aliphatic diene and an alkenyl monomer copolymerizable therewith with a complex consisting of sulfuric anhydride and an electron-donating compound and then neutralizing the sulfonation product, and has a sulfonic acid group content of 4–5.4 millimoles/g in terms of sodium sulfate and the surface tension of its aqueous solution is at least 50 dynes/cm.

4. The dispersing agent according to claim 1, which further contains a sulfuric acid salt in an amount of 1–200% by weight based on the weight of the salt of a sulfonation product of a polymer of an aliphatic diene or a copolymer of an aliphatic diene and an alkenyl monomer copolymerizable therewith.

5. The dispersing agent according to claim 1, wherein the aliphatic diene is at least one member selected from the group consisting of butadiene, isoprene and pentadiene.

6. The dispersing agent according to claim 1, wherein the sulfonation product is obtained by continuously adding a complex consisting of sulfuric anhydride and an electron-donating compound to a solution of a polymer of an aliphatic diene or a copolymer of an aliphatic diene and an alkenyl monomer copolymerizable therewith or by feeding the above solution and the above complex simultaneously to a reactor.

7. A solid fuel slurry composition comprising (a) the dispersing agent of claim 1, (b) solid fuel powder and (c) water as essential components.

8. The solid fuel slurry composition according to claim 7, which further contains at least one water-soluble polymer selected from the following (A) to (F), the weight ratio of the salt of the sulfonation product of the dispersing agent (a) to said water-soluble polymer being 15/85 to 95/5:

(A) polymer comprising a structural unit of a salt of naphthalenesulfonic acid, (B) polymer comprising a structural unit of a salt of ligninesulfonic acid, (C) polymer comprising a structural unit of a salt of styrenesulfonic acid, (D) polymer comprising a structural unit of a salt of norbornesulfonic acid, (E) polymer comprising a structural unit of a salt of carboxylic acid and (F) polymer comprising a structural unit of polyether.

9. The solid fuel slurry composition according to claim 7, wherein the amount of the (a) component is 0.01–10% by weight based on the total weight of the components (a), (b) and (c).

* * * * *